United States Patent [19]

Han

[11] Patent Number: 5,828,741
[45] Date of Patent: Oct. 27, 1998

[54] SYSTEM AND METHOD FOR PROVIDING A MULTI-NUMBER PLAN FOR USE WITH A GENERAL TELEPHONE AND A KEY TELEPHONE IN A KEY TELEPHONE SYSTEM

[75] Inventor: Hyo-Dong Han, Daegukwangyeok, Rep. of Korea

[73] Assignee: SamSung Electronics Co., Ltd., Suwon, Rep. of Korea

[21] Appl. No.: 701,432

[22] Filed: Aug. 22, 1996

[30] Foreign Application Priority Data

Aug. 24, 1995 [KR] Rep. of Korea .................. 1995 26426

[51] Int. Cl.⁶ ..................................................... H04M 1/00
[52] U.S. Cl. ............................ 379/157; 379/156; 379/164
[58] Field of Search ..................................... 379/156, 157, 379/164, 165, 166, 167, 158, 159, 160, 161, 162, 163, 198

[56] References Cited

U.S. PATENT DOCUMENTS

| | | | |
|---|---|---|---|
| 3,749,848 | 7/1973 | Knollman et al. | 379/157 |
| 3,902,024 | 8/1975 | Hijikata et al. | 379/156 |
| 4,072,825 | 2/1978 | McClay et al. | 379/157 |
| 4,559,417 | 12/1985 | Komuro et al. | 379/157 |
| 4,605,825 | 8/1986 | Komuro et al. . | |
| 4,631,364 | 12/1986 | Coyne et al. | 379/164 |
| 4,821,316 | 4/1989 | Okumura et al. | 379/156 |
| 4,873,717 | 10/1989 | Davidson et al. | 379/157 |
| 4,905,274 | 2/1990 | Cooper et al. . | |
| 5,119,413 | 6/1992 | Okumura et al. . | |
| 5,309,509 | 5/1994 | Cocklin et al. . | |
| 5,461,666 | 10/1995 | McMahan et al. | 379/157 |
| 5,659,603 | 8/1997 | Orlofsky | 379/157 |

FOREIGN PATENT DOCUMENTS

| | | | |
|---|---|---|---|
| 0059046 | 3/1988 | Japan | 379/156 |
| 0166893 | 7/1991 | Japan | 379/156 |

*Primary Examiner*—Curtis A. Kuntz
*Assistant Examiner*—Rexford Barnie
*Attorney, Agent, or Firm*—Robert E. Bushnell, Esq.

[57] ABSTRACT

A key telephone system having multi-number plan for assigning different number plans to a general telephone set and a key telephone set in a key telephone system, wherein the different number plans control performance of same function. A central processing unit performs the functions designated by the multi-number plan in response to an input from the dial keys of one of the general telephone set and the key telephone set. The central processing unit check an extension circuit to determine when a receiver of one of the subscriber extensions has been lifted, and when a receiver of one of said subscriber extensions has been lifted, determines whether the subscriber extension having the lifted receiver utilizes a first number plan or a second number plan by searching a number plan designation table for a position of the subscriber extension having the lifted receiver. The first number plan is assigned to those subscriber extensions having a key telephone set, and the second number plan is assigned to those extension subscribers having a general telephone set. The central processing unit determines whether an input from a dial key of the subscriber extension having the lifted receiver corresponds to a number stored in a table corresponding to one of a first number plan and a second number plan, and performs a function corresponding to the dial key when the input from the dial key corresponds to the number stored in the table corresponding to one of the first number plan and the second number plan.

15 Claims, 6 Drawing Sheets

| PLAN 1 | PLAN 2 | |
|---|---|---|
| 0 | 0 | FRONT DESK CALL |
| 11 | 1 | DINING ROOM CALL |
| 21 | 2 | ROOM SERVICE CALL |
| 29 | 3 | NIGHT CLUB CALL |
| 36 | 4 | WASHING ROOM CALL |
| 4 | 5 | VEHICLE WAIT CALL |
| 5 | 6 | AMUSEMENT HALL CALL |
| 6 | 7 | INFORMATION CALL |
| 71 | 8 | EMERGENCY CALL |
| 81 | * | BOY CALL |
| 88 | # | ALARM RESERVATION |
| 9 | 9 | CENTRAL OFFICE LINE AUTOMATIC SELECTION |

| | |
|---|---|
| ATTENDENT PORT CALL DIAL | 0 |
| PICKUP DIAL | 11 |
| EXTENSION SUBSCRIBER 21 | 21 |
| EXTENSION SUBSCRIBER 29 | 29 |
| EXTENSION SUBSCRIBER 36 | 36 |
| STORED DIAL TRANSMISSION | 4 |
| HOLD REINCOMING | 5 |
| COUNTERPART HOLD REINCOMING | 6 |
| EXTENSION GROUP 71 | 71 |
| CENTRAL OFFICE LINE NUMBER 81 | 81 |
| CENTRAL OFFICE LINE NUMBER 88 | 88 |
| CENTRAL OFFICE LINE AUTOMATIC SELECTION | 9 |

*Fig. 1*

| | |
|---|---|
| FRONT DESK CALL | 1 |
| | 0 |
| DINING ROOM CALL | 2 |
| | 1 |
| | 1 |
| AMUSEMENT HALL CALL | 1 |
| | 5 |

*Fig. 7*

| PLAN 1 | PLAN 2 | |
|---|---|---|
| 0 | 0 | FRONT DESK CALL |
| 11 | 1 | DINING ROOM CALL |
| 21 | 2 | ROOM SERVICE CALL |
| 29 | 3 | NIGHT CLUB CALL |
| 36 | 4 | WASHING ROOM CALL |
| 4 | 5 | VEHICLE WAIT CALL |
| 5 | 6 | AMUSEMENT HALL CALL |
| 6 | 7 | INFORMATION CALL |
| 71 | 8 | EMERGENCY CALL |
| 81 | * | BOY CALL |
| 88 | # | ALARM RESERVATION |
| 9 | 9 | CENTRAL OFFICE LINE AUTOMATIC SELECTION |

*Fig. 5*

| | |
|---|---|
| EXTENSION SUBSCRIBER A | NUMBER 1 |
| EXTENSION SUBSCRIBER B | NUMBER 2 |
| EXTENSION SUBSCRIBER C | NUMBER 2 |
| EXTENSION SUBSCRIBER D | NUMBER 1 |
| ⋮ | ⋮ |
| EXTENSION SUBSCRIBER Z | NUMBER 2 |

*Fig. 6*

SYSTEM AND METHOD FOR PROVIDING A MULTI-NUMBER PLAN FOR USE WITH A GENERAL TELEPHONE AND A KEY TELEPHONE IN A KEY TELEPHONE SYSTEM

CLAIM OF PRIORITY

This application makes reference to, incorporates the same herein, and claims all benefits accruing under 35 U.S.C §119 from an application entitled Multi Number Plan Method In Key Phone System earlier filed in the Korean Industrial Property Office on 24 Aug. 1995, and there duly assigned Serial No. 26426/1995 by that Office.

BACKGROUND OF THE INVENTION

1. Field of the Invention

The present invention relates to a system and method for providing a multi-number plan for use with a general telephone set and a key telephone set in a key telephone system and, in particular, to a system and method for providing a table of numbers for use by the general telephone set and a different table of numbers for use by the key telephone set for performing the same function in the key telephone system.

2. Description of the Related Art

Typically, currently available key telephone systems are manufactured with a plurality of terminals and a main unit in a local environment, such as an office, hotel, restaurant, or other multi-extension installation, that provides immediate access from all terminals to a variety of telephone service features without attendant or operator assistance. The system may, or may not, interface to provide telecommunications access directly with a public switched-telephone network.

Generally with contemporary systems, the main unit performs certain functions, such as forwarding a call to an extension, placing a call on hold, calling all extensions as an intercom, speed dialing, redialing, calling a number external to the local environment, and initiating other key controlled operations, in response to manipulations of function keys by the user of the terminals, i.e., the key telephone sets. Usually, in order to simplify operations of the key telephone system, each key telephone set will have a plurality of function keys, each key being programmed to perform a different, but specific desired function, and corresponding function keys for each key telephone set are usually identically programmed. It is not infrequent practice to assign different functions to the assignable function keys of some of the key telephone sets when these particular sets do not need all of the functions of the other key telephone sets and, as a matter of convenience, some function keys in one key telephone set perform functions not necessarily performed by function keys of the other key telephone sets. With respect to the latter instance, the following U.S. patents utilize different techniques for assigning functions to function keys of a key telephone, these are: U.S. Pat. No. 4,605,825 to Isaku Komuro, et al. entitled Function Key Assignments In A Key Telephone System; U.S. Pat. No. 4,905,274 to Bret A. Cooper, et al. entitled Key Telephone Management System; U.S. Pat. No. 5,309,509 to Sherri L. Cocklin, et al. entitled Graphical User Interface Workstation; and U.S. Pat. No. 5,119,413 to Yukiko Okamura, et al. entitled System And Method To Alter Functions Assigned To The Keys Of A Terminal Connected To An Electronic Device.

It is also known to use a general telephone set, that is, a telephone that has fewer or no function keys and either a rotary dial or only the conventional alphanumeric keypad (e.g. frequently a twelve digit keypad with separate keys (dial keys) for each of the ten digits, the "*" and the "#" symbols), as, for example, an extension telephone in a key telephone system. An example of such a key telephone system can frequently be found in a hotel, wherein each room has a general telephone available to each of the lodgers. Accordingly, by dialing a predetermined number on the conventional keypad, a preset function can be performed. In such a system, key telephone sets are also connected in the system and the same function performed in response to the dialing of the via the twelve digit keypad of the general telephone set is also performed by dialing the same number with the twelve digit keypad in the key telephone set. Thus the key telephone system configured with both general telephone sets and key telephone sets customarily uses only a single number plan.

SUMMARY OF THE INVENTION

It is therefore an object of the present invention to provide an improved key telephone system.

It is another object to provide a system and method for incorporating a multi-number plan accommodating use of a general telephone set with a key telephone set in a key telephone system, respectively embodying different number plans for the general telephone set and the key telephone set.

It is still another object to provide a key telephone system able to accommodate more than one numbering scheme.

It is yet another object to provide a key telephone system able to accommodate a key telephone set using one number scheme and a general telephone set having a twelve digit keypad using a second and different numbering scheme.

These and other objects can be achieved according to the principles of the present invention with a multi-number plan in a key telephone system by storing a desired numbering plan at a plan designation table for each of the individual extension subscribers. When any extension subscriber lifts a receiver, a search of the of the plan designation table is made to determine which number plan corresponds to the subscriber extension. An input from the dial key activates a function designated by the number plan corresponding to the dial key.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIG. 1 is a diagram illustrating an example of the construction of single number plan table configured according to the principles of the present invention;

FIG. 5 is a diagram illustrating the construction of the table of a multi-number plan according to the principles of the present invention;

FIG. 6 is a diagram illustrating the arrangement of the number plan designation table for each extension subscriber according to the principles of the present invention; and FIG. 7 is diagram illustrating the construction of s table of s number plan illustrated by FIG. 5.

DETAILED DESCRIPTION OF THE PREFERRED EMBODIMENTS

Turning now to the drawings, FIG. I is an example illustrating a single number plan wherein a number that is dialed according to the plan by either a general telephone set or a key telephone set causes the system to perform the corresponding function. For instance, by pressing the No. 9 key on the dial of either telephone set, the system connects the telephone set to an automatically selected central office line, or by pressing No. 21, extension subscriber 21 is called.

Figure 2:
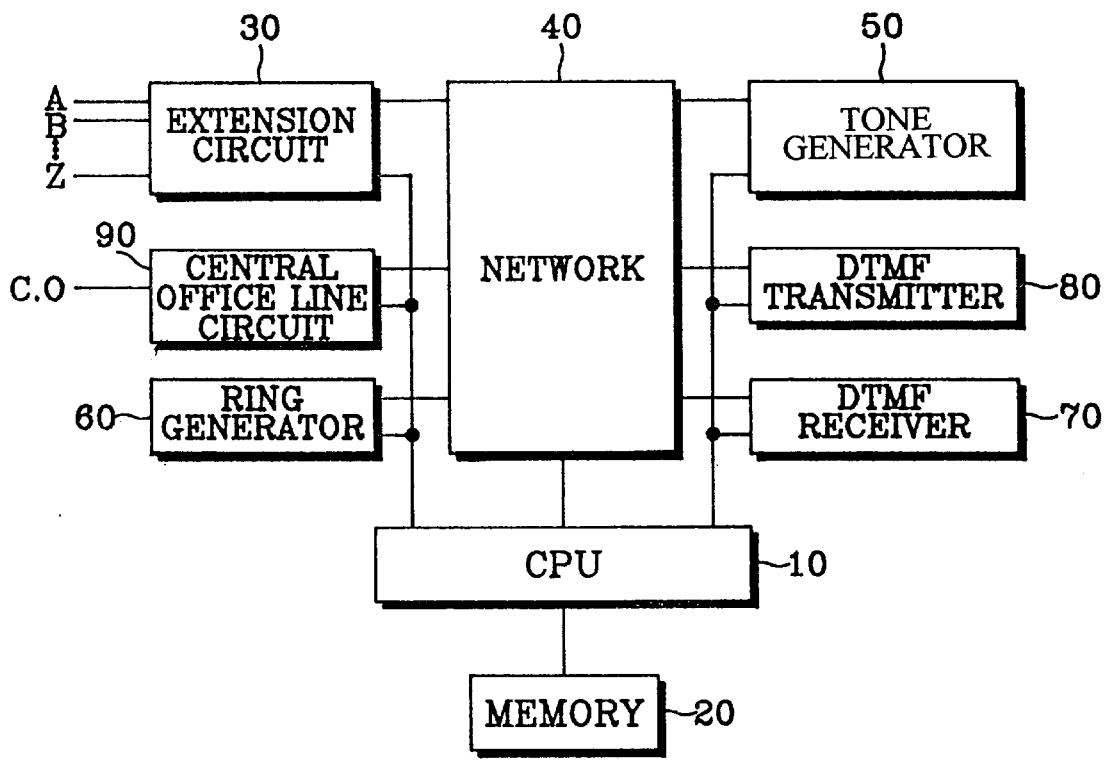
FIG. 2 is a block diagram illustrating the construction of a key telephone system according to the principles of the present invention.

Referring now to FIG. 2, key telephone system according to the present invention has a central processing unit 10 (hereinafter, referred to as CPU) for accessing a preset program, for controlling speech switching and performance of all kinds of services and functions accompanied as a multi-number plan of the present invention. Memory 20 stores the preset program, i. e., the program initial service data for performing all of functions and calls at an interior thereof and temporarily stores the data generated while performing the program. Extension circuit 30 supplies a call current of a voice bandpass to the key telephone and the general telephone of the extension subscriber and interfaces extension telephones (A–Z) with the system components. A network 40 is provided for switching all kinds of tone and voice data under the control of CPU 10, tone generator 50 generates all kinds of tone signals in response to the control of CPU 10 and supplies the generated tone signals to network 40, a ring generator 60 supplies a ring signal in a format of a square wave to network 40 in response to the control of CPU 10, and a DTMF (dual tone multi-frequency) receiver 70 analyzes a MFC (multi frequency code) generated from the extension subscriber (A–Z) of extension circuit 30 and applies digit data, corresponding to the analyzed result, to CPU 10. DTMF transmitter 80 outputs an MFC signal under the control of CPU 10, and a central office line circuit 90 is provided for seizing the central office line responsive to the control of CPU 10 in order to form a central office line loop, and interface a signal which is incoming from the central office line.

Figure 3A:
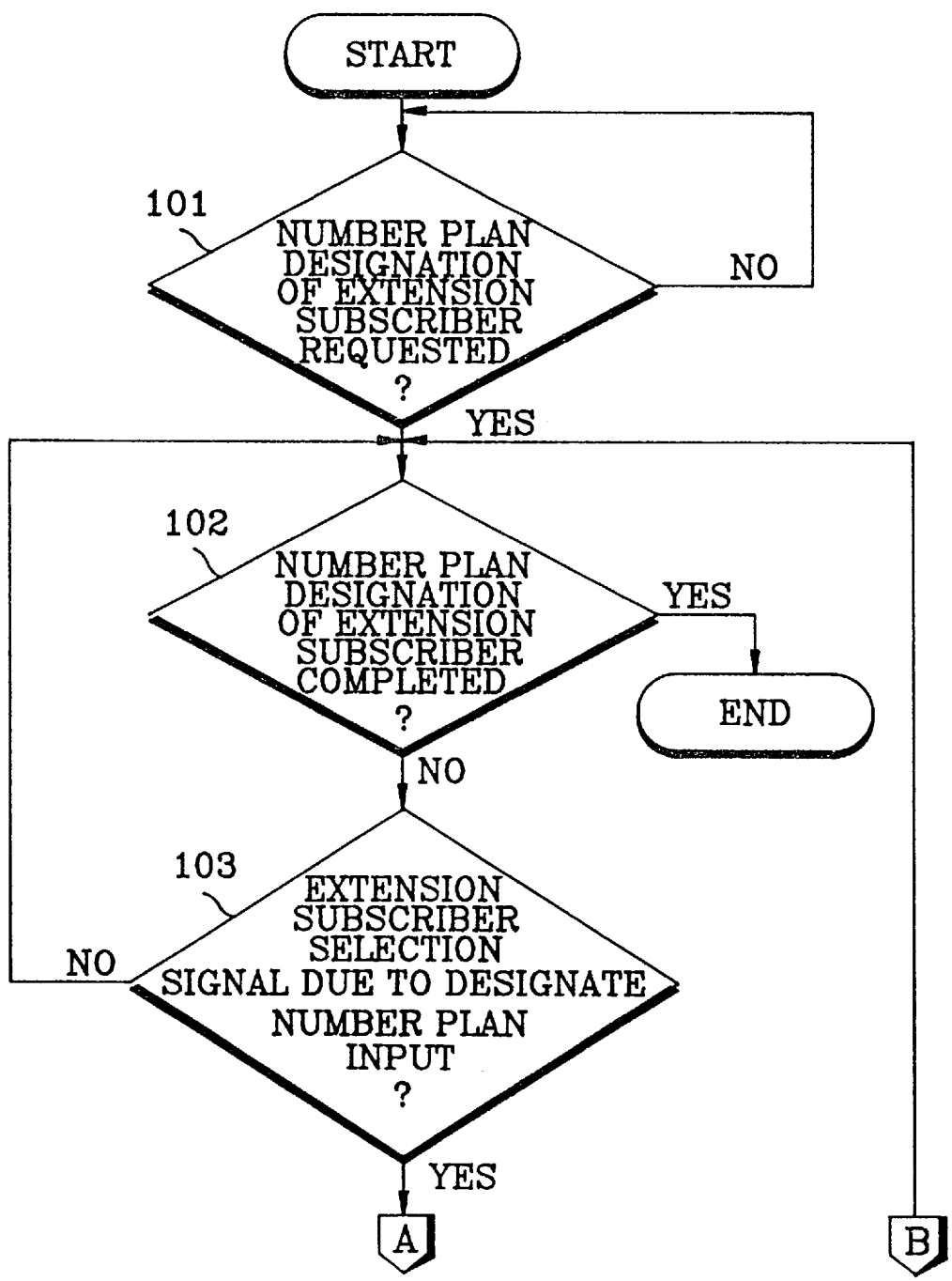
FIGS. 3A and 3B are flow charts illustrating the steps for storing a number plan desired by an extension subscriber at a number plan designation table for each extension subscriber according to the principles of the present invention.
Figure 3B:
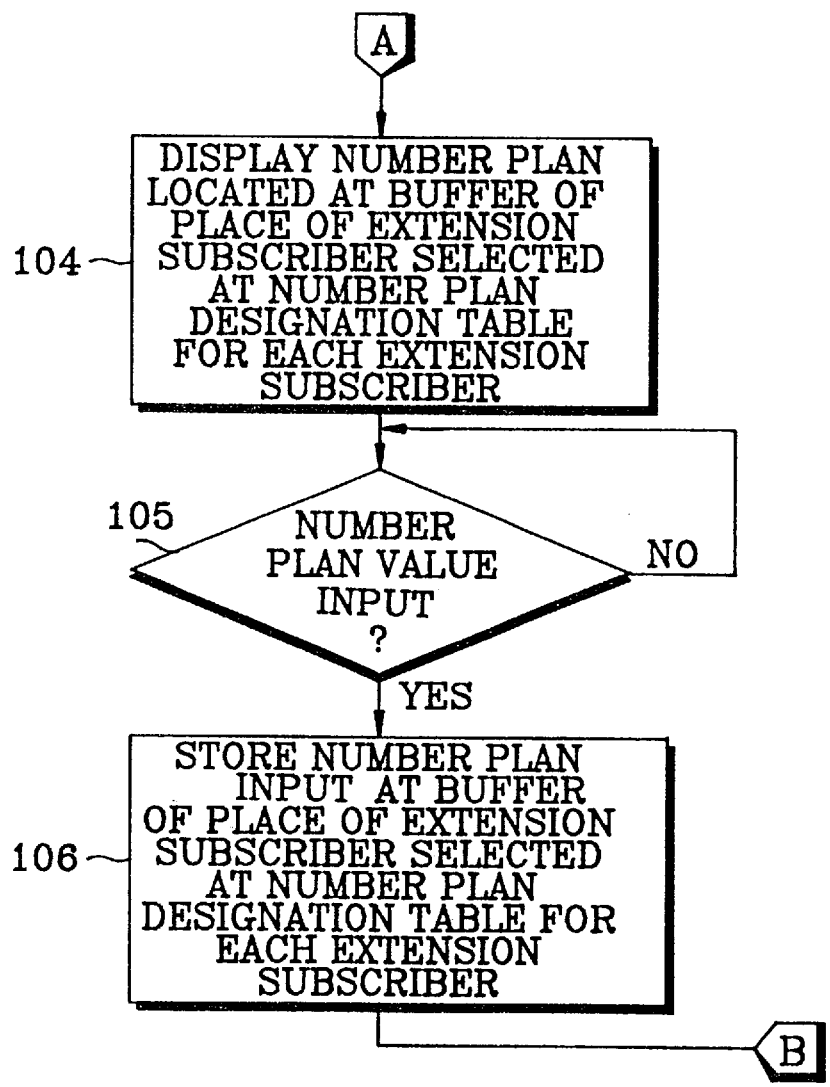

Referring now to FIGS. 3A and 3B together, the operation of storing the number plan desired by the extension subscriber at the number plan designation table for each extension subscriber will be explained. CPU 10 continuously checks, in step 101, whether or not the number plan designation of each extension subscriber A through Z was requested through extension circuit 30, until the number plan designation of each extension subscriber A–Z was requested therethrough, then CPU 10 proceeds to step 102. At this time, CPU 10 checks whether or not the number plan designation of each extension subscriber A through Z was completed. When it is determined that the number plan designation of each extension subscriber A through Z was completed, CPU 10 ends the program. When it is determined that the number plan designation of each extension subscriber was not completed, however, CPU 10 proceeds to step 103. At step 103 CPU 10 checks whether or not an extension subscriber selection signal for designating which number plan is to be assigned to the extension subscriber is input. When it is determined that the extension subscriber selection signal for designating the number plan is not input, CPU 10 returns to step 102. When it is determined that the extension subscriber selection signal for designating the number plan is input, CPU 10 proceeds to step 104. CPU 10 then displays the number plan located at a buffer of the place of the extension subscriber selected at the number plan designation table for each extension subscriber, at a displaying device of the key telephone system. Furthermore, in step 105, CPU 10 continuously checks whether or not the number plan value is input through extension circuit 30, until it is determined that the number plan value was input through extension circuit 30. Once it is determined that the number plan value was input through extension circuit 30, CPU 10 proceeds to step 106. In step 106, CPU 10 stores in memory 20, the multi-number plan input at the buffer of the place of the extension subscriber selected at the number plan designation table for each extension subscriber as shown in FIG. 6. At this point, it is noted that the key telephone system subscriber among extension subscribers A through Z is assigned number plan 1 and the general telephone subscriber is assigned number plan 2. Thereafter, CPU 10 returns to the step 102, thereby repeatedly performing the above operations until the number plan designation for each extension subscriber A through Z is completed.

Figure 4:
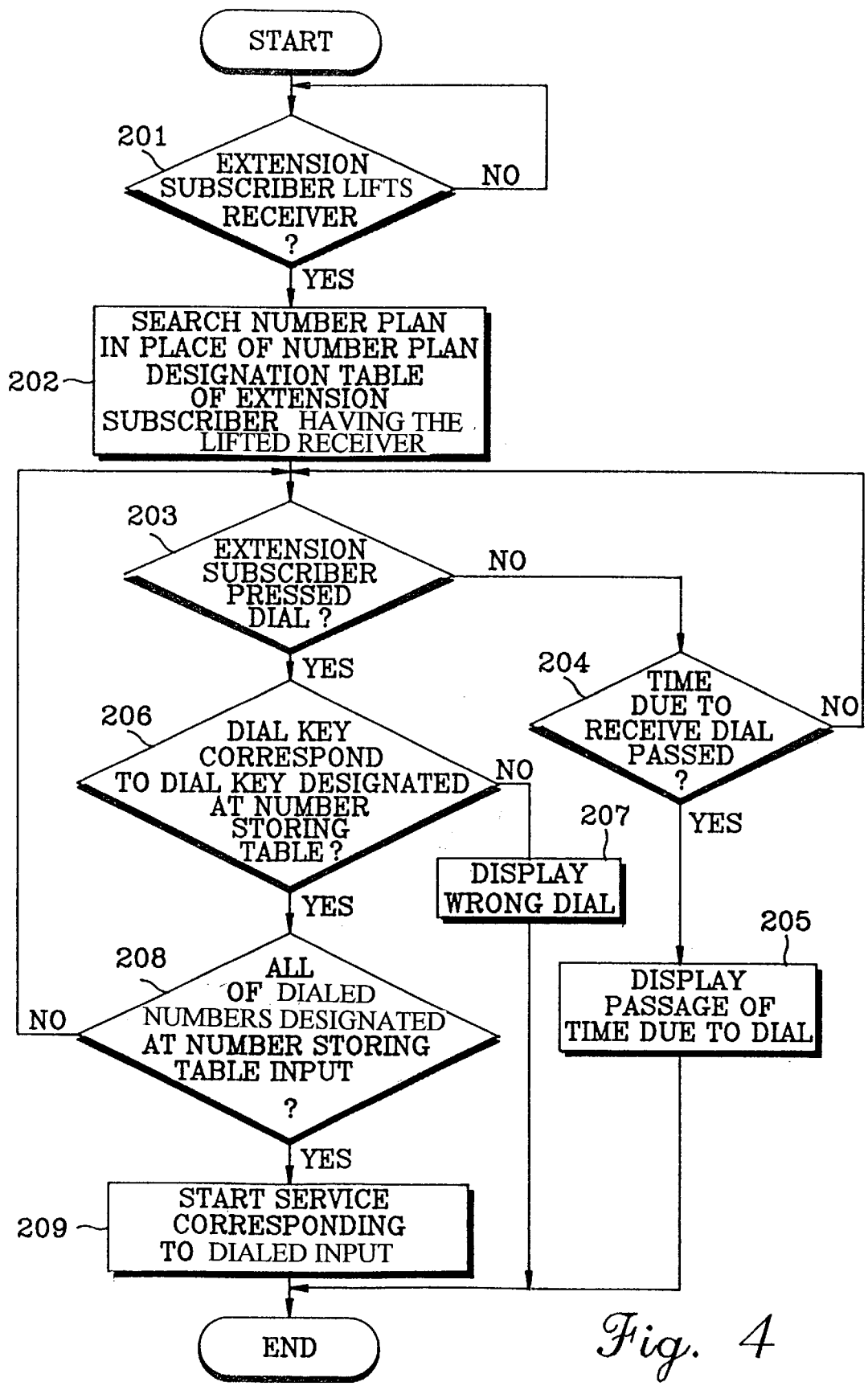
FIG. 4 is a flow chart illustrating the steps for controlling a corresponding function by receiving dialed numbers from an extension subscriber after designating the number plan for each extension subscriber according to the principles of the present invention.

After storing the number plan at the place of the extension subscriber as described hereinabove, the operation of controlling the performance of a desired function will described with reference to FIG. 4. With regard to FIG. 4, CPU 10 checks, in step 201, extension circuit 30 to determine whether or not an extension subscriber lifts (off-hooks) the receiver (handset) of the telephone. When it is determined that a receiver of an extension subscriber has been lifted, CPU 10 searches the number plan at the place of the number plan designation table of the extension subscriber which lifted the receiver thereof and directs the number storing table of the corresponding number plan. That is, a determination is made as to whether the telephone of the subscriber which lifted the receiver thereof corresponds to the key telephone or the general telephone, then CPU 10 finds the number plan for the number plan 1 or the number plan 2. Moreover, in step 203, CPU 10 checks whether or not the dial key is pressed down to perform an arbitrary function by the extension subscriber. Here, when the extension subscriber does not press down the dial key, CPU 10 proceeds to step 204 and checks whether or not a set time period is passed to receive the dial. When it is determined that the set time period has passed, CPU 10 displays, in step 205, a message indicating the passage of the set time period at the displaying device of the key telephone and ends the program. When it is determined, however, that the set time period has not passed thereto, CPU 10 returns to the step 203, thereby detecting existence/nonexistence of the input of the dial key, i.e., whether or not the dial key is inputted. Once it is determined that the dial key was pressed down by the extension subscriber within the set time period, CPU 10 proceeds to step 206 and checks whether or not the pressed dial key corresponds to a dial key designated in the number storing table. When the pressed dial key does not correspond to a dial key designated in the number storing table, the CPU 10 proceeds to step 207. In the above step 207, CPU 10 displays a message indicating a wrong dial at the displaying device of the telephone through extension circuit 30. To the contrary, when the pressed dial key corresponds to a dial key designated in the number storing table, CPU 10 proceeds to step 208, in order to check whether or not all the numbers dialed are designated in the number storing table. In the event that all of the dialed numbers were not designated in the number storing table, CPU 10 returns to step 203. When all of the dialed numbers are determined to have been designated in the number storing table, CPU 10 proceeds to step 209. In step 209, CPU 10 services a function corresponding to the dialed number.

Referring now to FIG. 5, a dialed number input by the key telephone according to plan 1 causes CPU 10 to perform the same function that would be performed in response to a dialed number input from the general telephone using plan 2. For example, if the telephone of the extension subscriber which lifted the receiver corresponds to a key telephone and dial key No. 21 is input, CPU 10 calls room service. On the other hand, if the telephone of the extension subscriber which lifted the receiver corresponds to a general telephone and dial key No. 2 is input, CPU 10 calls the room service. Note that an input of dial key No. 21 by a general telephone does not correspond to a function according to plan 2, and CPU 10 will display a wrong number message. Likewise an input of dial key No. 2 by a key telephone will cause CPU 10 to display a wrong number message.

FIG. 7 is a diagram illustrating the construction of the table of the number plan 1 of FIG. 5, in which, when making a call to the front desk, i.e., front desk call, using the key telephone set, the number is a one digit number and the call number is set to "0". Also, when making a call to the dining room, i.e., dining room call, the call number is a two digit number and the call number is set to "11". Additionally, when making a call to the amusement hall, i.e., amusement hall call, the call number is a one digit number and the call number is set to "5". In other words, the stored call numbers, i.e., "0", "11", and "5", are preceded by a number indicating the number of digits that are in the call number, i.e., "1", "2", and "1", respectively, As apparent from the foregoing, the present invention has a good effect on simply embodying a function upon performing the corresponding function by using the general telephone, because of being capable of freely changing the number plan in the key telephone system if a need arises and of properly designating the dial number acquainted to the user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment discloses as the best mode contemplated for carrying out the present invention, but that the present invention includes all embodiments falling within the scope of the appended claims.

What is claimed is:

1. A multi-number plan method in a key telephone system having plural subscriber extensions, wherein said subscriber extensions comprise general telephone sets and key telephone sets, comprising the steps of:

storing a desired number plan at a number plan designation table for each subscriber extension, said desired number plan comprising a first number plan for said key telephone sets and a second number plan for said general telephone sets, said first number plan and said second number plan being different from each other, and said first and second number plans controlling operation of a same set of desired functions;

determining when a receiver of any one of said subscriber extensions has been lifted;

determining whether said subscriber extension having the lifted receiver utilizes said first number plan or said second number plan by searching said number plan designation table for a position of said subscriber extension having the lifted receiver;

determining whether an input from a dial key of said subscriber extension having the lifted receiver corresponds to a number stored in a table corresponding to one of said first number plan and said second number plan according to the determination made as to whether said subscriber extension having the lifted receiver utilizes said first number plan or said second number plan; and performing a function corresponding to said dial key when said input from said dial key corresponds to a number stored in said table corresponding to one of said first number plan and said second number plan.

2. The method as set forth in claim 1, further comprising the steps of:

checking for an input within a predetermined time period from said dial key of said subscriber extension having the lifted receiver after said step of determining whether said subscriber extension having the lifted receiver utilizes said first number plan or said second number plan; and displaying a message indicating said time period has elapsed when there is no input from said dial key of said subscriber extension having the lifted receiver within said predetermined time period.

3. The method as set forth in claim 1, said step of storing a desired number plan at a number plan designation table for each subscriber extension comprises the step of:

storing said first number plan at said number plan designation table when said subscriber extension corresponds to one of said key telephone sets.

4. The method as set forth in claim 1, said step of storing a desired number plan at a number plan designation table for each subscriber extension comprises the step of:

storing said second number plan at said number plan designation table when said subscriber extension corresponds to one of said general telephone sets.

5. The method as set forth in claim 1, further comprising the step of:

displaying a message indicating input of a wrong number when said input from said dial key does not correspond to a number stored in said table corresponding to one of said first number plan and said second number plan.

6. The method as set forth in claim 1, said step of storing a desired number plan at a number plan designation table for each subscriber extension comprises the steps of:

checking for input of a subscriber extension selection signal from each of said subscriber extensions for designating which one of said first and second number plans is to be assigned each said subscriber extension; and storing a number plan value indicative of one of said first and second number plans at corresponding buffer positions of said number plan designation table for each said subscriber extension inputting said subscriber extension selection signal.

7. A key telephone system having plural subscriber extensions, wherein said subscriber extensions comprise general telephone sets and key telephone sets, said key telephone system utilizing a multi-number plan, said key telephone system comprising:

a central processing unit for performing functions designated by said multi-number plan; and an extension circuit for interfacing said subscriber extensions with said central processing unit;

said central processing unit checking said extension circuit to determine when a receiver of one of said subscriber extensions has been lifted;

when a receiver of one of said subscriber extensions has been lifted, said central processing unit determining whether said subscriber extension having the lifted receiver utilizes a first number plan or a second number plan by searching a number plan designation table for a position of said subscriber extension having the lifted receiver;

said central processing unit determining whether an input from a dial key of said subscriber extension having the lifted receiver corresponds to a number stored in a table corresponding to one of said first number plan and said second number plan;

said central processing unit performing a function corresponding to said dial key when said input from said dial key corresponds to said number stored in said table corresponding to one of said first number plan and said second number plan.

8. The key telephone system as set forth in claim 7, further comprising:

a memory for storing said first and second number plans and said number plan designation table;

a network for switching tone and voice data under control of said central processing unit;

a tone generator for generating tone signals and supplying said tone signals to said network under control of said central processing unit;

a ring generator for supplying a square wave ring signal to said network under control of said central processing unit;

a dual tone multi-frequency receiver for supplying digit data to said central processing unit by analyzing a multi-frequency code generated by one of said extension subscribers;

a dual tone multi-frequency transmitter for transmitting a multi-frequency code to said network under control of said central processing unit; and central office line means for forming a central office line loop by seizing a central office line under control of said central processing unit;

said central office line means interfacing said key telephone system with said central office line.

9. The key telephone system as set forth in claim 7, further comprising:

said central processing unit checking for an input within a predetermined time period from said dial key of said subscriber extension having the lifted receiver after determining whether said subscriber extension having the lifted receiver utilizes said first number plan or said second number plan; and displaying a message indicating said time period has elapsed when there is no input from said dial key of said subscriber extension having the lifted receiver within said predetermined time period.

10. The key telephone system as set forth in claim 7, further comprising:

said central processing unit checking for input of a subscriber extension selection signal from each of said subscriber extensions for designating which one of said first and second number plans is to be assigned each said subscriber extension; and said central processing unit storing a number plan value indicative of one of said first and second number plans at corresponding buffer positions of said number plan designation table for each said subscriber extension inputting said subscriber extension selection signal.

11. The key telephone system as set forth in claim 8, further comprising:

said central processing unit checking for input of a subscriber extension selection signal from each of said subscriber extensions for designating which one of said first and second number plans is to be assigned each said subscriber extension; and said central processing unit storing in said memory a number plan value indicative of one of said first and second number plans at corresponding buffer positions of said number plan designation table for each said subscriber extension inputting said subscriber extension selection signal.

12. A multi-number plan method in a key telephone system having plural subscriber extensions, wherein said subscriber extensions comprise general telephone sets and key telephone sets, comprising the steps of:

checking for input of a subscriber extension selection signal from each of said subscriber extensions for assigning each of said subscriber extensions with a determined number plan;

storing a number plan value indicative of one of a first number plan and a second number plan of said determined number plan at corresponding buffer positions of a number plan designation table for each said subscriber extension inputting said subscriber extension selection signal, said first number plan and said second number plan being different from each other, and said first and second number plans controlling operation of a same set of desired functions;

determining when a receiver of any one of said subscriber extensions has been lifted;

determining whether said subscriber extension having the lifted receiver utilizes said first number plan or said second number plan by searching said number plan designation table for a position of said subscriber extension having the lifted receiver;

determining whether an input from a dial key of said subscriber extension having the lifted receiver corresponds to a number stored in a table corresponding to one of said first number plan and said second number plan according to the determination made as to whether said subscriber extension having the lifted receiver utilizes said first number plan or said second number plan; and performing a function corresponding to said dial key when said input from said dial key corresponds to a number stored in said table corresponding to one of said first number plan and said second number plan.

13. The method as set forth in claim 12, said step of storing a desired number plan at a number plan designation table for each subscriber extension comprises the step of:

storing said first number plan at said number plan designation table when said subscriber extension corresponds to one of said key telephone sets.

14. The method as set forth in claim 12, said step of storing a desired number plan at a number plan designation table for each subscriber extension comprises the step of:

storing said second number plan at said number plan designation table when said subscriber extension corresponds to one of said general telephone sets.

15. The method as set forth in claim 12, further comprising the steps of:

checking whether or not a number plan designation of each subscriber extension was requested until it is determined that said number plan designation of each subscriber was requested;

checking whether or not said number plan designation of each subscriber was completed; and performing said step of checking for input of a subscriber extension selection signal, when it is determined that said number plan designation of each subscriber was not completed.

\* \* \* \* \*